May 14, 1929.   L. ROEBEL   1,712,520
SINGLE PHASE OPERATION OF POLYPHASE MACHINES
Filed May 12, 1927
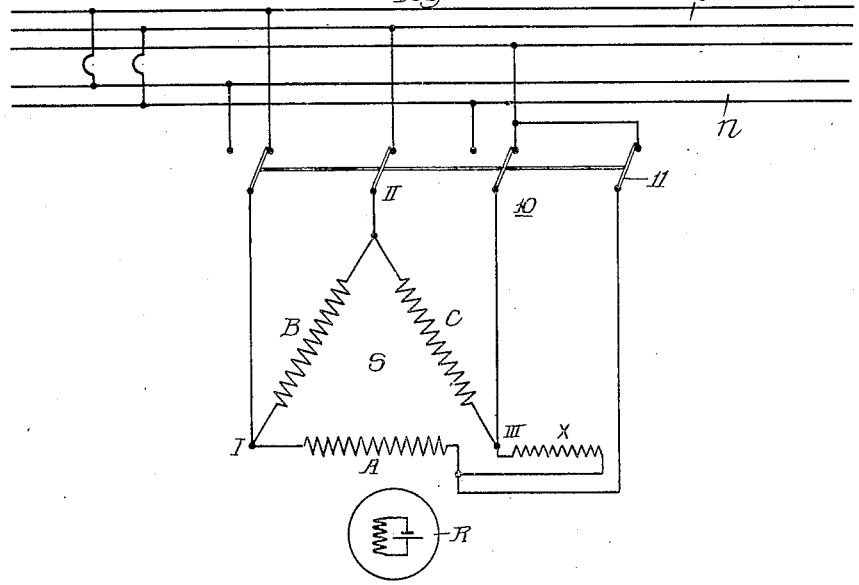
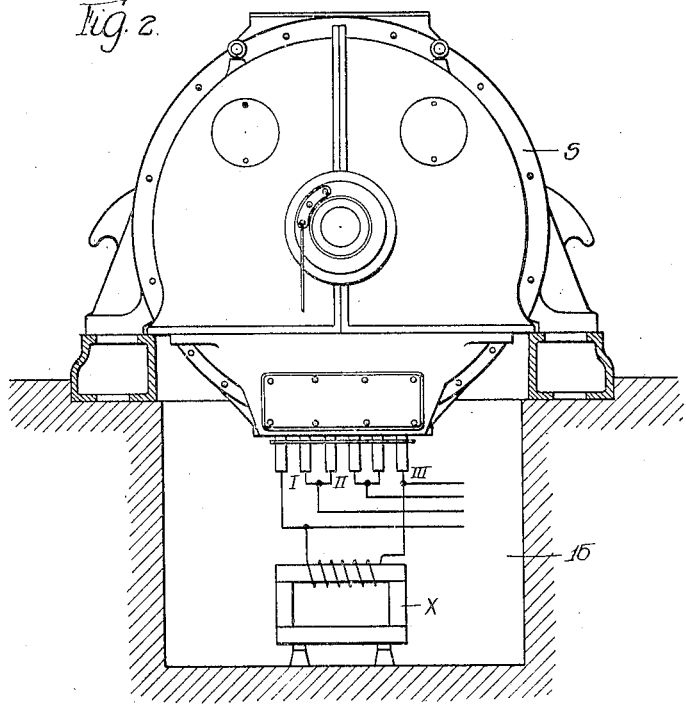
Witness:
R. Burkhardt
Inventor:
Ludwig Roebel,
By Cromwell, Greist & Warden
Attys Patented May 14, 1929.

1,712,520

UNITED STATES PATENT OFFICE.

LUDWIG ROEBEL, OF MANNHEIM, GERMANY, ASSIGNOR TO AKTIENGESELLSCHAFT BROWN, BOVERI & CIE., OF BADEN, SWITZERLAND, A JOINT-STOCK COMPANY OF SWITZERLAND.

SINGLE-PHASE OPERATION OF POLYPHASE MACHINES.

Application filed May 12, 1927, Serial No. 190,761, and in Germany May 25, 1926.

My invention relates to single-phase operation of polyphase machines and it has among its objects methods and apparatus for better utilization of polyphase alternating machines when operated as single-phase machines. It has particular reference to three-phase machines utilizing delta or mesh-connected alternating current windings.

According to my invention polyphase machines having three-phase delta-connected windings are utilized for single-phase operation by connecting two of the terminals of the mesh-connected winding to the single-phase line and inserting in circuit with the windings of the phase which is directly connected across the single-phase line an additional impedance means, such as a reactor, to cause the current flowing through said phase winding to be substantially equal or balanced with the current flowing in the two other phase windings which are connected in series between the terminals of the single-phase line.

The objects of the invention will best be understood from the following description of exemplifications thereof. In the accompanying drawings, Fig. 1 is a circuit diagram of a polyphase alternator arranged for operation either polyphase or single-phase according to the invention; and Fig. 2 is an end elevation of an alternator illustrated in Fig. 1, showing the mounting of the several parts of the machine.

Electrical machines, such as alternators, converters, motors, transformers, which are wound for three-phase operation, are often required to operate single-phase. Difficulties are encountered in case delta or mesh-connected three-phase alternators, as are commonly employed for generating three-phase currents, are to be connected for single-phase operation. If, namely, only two of the three-mesh terminals of such winding are connected to a single-phase line, the load will be unequally distributed between the three-phases of the winding, since the two parallel paths of the winding have different numbers of turns. In fact, one of the parallel branches of the winding includes one phase winding only, while the other branch includes two serially-connected phase windings with substantially twice as many turns as the other branch. Offhand, there would be no reason to anticipate such difficulties in the current distribution because the effective voltages induced in the two branches of the windings are equal.

According to the invention the foregoing difficulties in respect to the non-uniform distribution of the current in the two parallel paths is avoided by inserting an additional impedance, preferably in the form of reactance, in the path which contains the smaller number of turns. With such arrangement, when the three-phase alternator is to be operated single-phase, an additional impedance is connected in series with the phase winding which lies directly connected across the single-phase mains, the additional impedance being so proportioned that the current distribution in the two parallel paths of the generator winding is substantially uniform. This may be effected in a simple way by connecting the additional impedance element as a fourth element in mesh with the three-phase windings, the additional element being inserted in series with one of the phases. Under three-phase operation, the additional impedance element is readily cut out by simply short-circuiting said element with a suitable switch. For single-phase operation the short-circuiting connection is opened and the single-phase line is connected to two diametrically opposite corners of the quadrangle formed of the three-phase windings with the serially-connected additional impedance element. The change-over from three-phase operation to single-phase operation is very simple, and does not require any alterations in the internal construction of the machine or of the windings. The output of the alternator, when used in the manner described hereinabove on single-phase operation, is about one and one-half times greater than when used without such additional reactor in the path having the smaller number of turns.

In the diagrammatic exemplification of the invention illustrated in the drawing, a three-phase alternator is shown comprising a stator S having three-phase windings A, B, C cooperating with a rotor R that is suitably excited to produce an inducing field. The three-phase windings A, B, and C, having approximately the same number of turns, are arranged to be connected in mesh for operation on three-phase current, the three-mesh terminals of the winding being designated by I, II and III. A switch 10 serves to connect said mesh terminals to three-phase mains $m$, when the switch is in the right-hand position illustrated in the drawing. Included in series with the phase winding A of the alternator, there is an additional impedance element, in the form of a reactor X, connected between one end terminal of said winding and the mesh terminal III to which said winding terminal is connected for three-phase operation. This direct connection of the end terminal of the winding A to the mesh terminal III under polyphase operation is effected by the additional switching member 11 which, in effect, short-circuits said reactor X when said switching member is in the right-hand position. Accordingly, perfectly balanced three-phase operation will be obtained.

When it is desired to operate the alternator single-phase, the short-circuit across the terminals of the reactor X is opened and the single-phase line on which the alternator is to operate is directly connected to two diametrically opposite corners of the quadrangle formed by the mesh-connected phase windings A, B, C and reactor X. In the example shown in the drawing this is effected by simply throwing the switch 10 to the left. This automatically opens the short-circuit established across the reactor X and connects the mesh terminals I and III of the winding to a pair of auxiliary single-phase bus-bars $n$ which are in turn connected to one phase of the polyphase mains $m$. Balanced current flow under single-phase operation will then be obtained because the higher number of turns in the branch of the winding including the phases B and C of the alternator is balanced by the reactor X which is connected in series with the phase A of the alternator that lies directly across the terminals of the single-phase winding.

This simple arrangement thus permits a much better utilization of the capacity of the alternator and increases the output of such machines greatly beyond what was considered permissible heretofore.

In Figure 2 there is shown a simple arrangement for mounting the additional reactor, a pit 15 being provided in the foundation underneath the stator S of the alternator, the reactor X being mounted in said pit.

I claim as my invention:

1. The method of operating a polyphase machine having three delta-connected substantially balanced phase windings on single-phase currents which comprises connecting two mesh terminals of said winding across the single-phase line and including in series with the phase winding which is directly connected across said line additional impedance means to secure substantial current balance in said phase winding with relation to the two other phase windings which are connected in series across said line.

2. In combination, a polyphase electric machine having three delta-connected phase windings, means for connecting the three mesh terminals of said windings to a polyphase line for operating said machine with polyphase currents, means for connecting two of said windings in series relation with respect to each other across a single-phase line to operate said machine with single-phase current, impedance means, and means providing for connection of said impedance means in series relation with the third phase winding and for connection of such series in parallel relation with respect to the series comprising said two windings, said impedance means and said third winding having substantially the same total impedance to the flow of single-phase current as said two windings.

3. In combination, a polyphase machine having three-phase windings connected in delta, means for connecting the three mesh terminals of said winding to a three-phase line for operating said machine with three-phase currents, means for connecting two of the mesh terminals of said windings to a single-phase line and disconnecting the third mesh terminal from said three-phase line, reactor means, and means operable to provide for insertion of said reactor means in that branch of the two parallel-connected branches of the winding including only one phase winding, said reactor means and the single associated serially-connected phase winding being so balanced with respect to the two other serially-connected phase windings that substantially balanced current flow takes place in said two parallel branches.

4. The method of providing for single-phase operation of a polyphase machine wherein certain of the windings thereof are connected in series relation and such series connected in parallel relation with respect to the other of said windings to form a plurality of parallel-connected branches, said method consisting in varying the impedance of certain of said branches by such amount as to make the respective impedances of said branches substantially equal to each other.

5. In apparatus of the character described, a dynamo-electric machine having a polyphase winding, a single-phase line, means operable to provide for balancing of said winding for single-phase operation, and means operable to provide an operating connection between said line and said winding and to render said balancing means effective with respect to the latter.

In testimony thereof I have hereunto subscribed my name this 22nd day of April, A. D. 1927, at Stuttgart, Germany.

LUDWIG ROEBEL.